United States Patent

Ishino et al.

[11] Patent Number: 5,622,050
[45] Date of Patent: Apr. 22, 1997

[54] SYSTEM FOR CONTROLLING A HYDROSTATIC-MECHANICAL TRANSMISSION AT THE TIME OF VEHICLE ACCELERATION OR DECELERATION

[75] Inventors: Tsutomu Ishino, Osaka; Ryoichi Maruyama, Kanagawa; Takashi Noda, Osaka, all of Japan

[73] Assignee: Kabushiki Kaisha Komatsu Seisakusho, Tokyo, Japan

[21] Appl. No.: 395,470

[22] Filed: Feb. 28, 1995

[30] Foreign Application Priority Data

Mar. 1, 1994 [JP] Japan ................................... 6-031608

[51] Int. Cl.$^6$ ................................................. F16D 31/02
[52] U.S. Cl. .................................. 60/431; 475/76; 475/80
[58] Field of Search ........................ 60/431, 433; 475/76, 475/80

[56] References Cited

U.S. PATENT DOCUMENTS

| | | | |
|---|---|---|---|
| 4,531,431 | 7/1985 | Dreher et al. | 60/431 |
| 4,949,596 | 8/1990 | Iino et al. | 60/431 |
| 5,406,793 | 4/1995 | Maruyama et al. | 60/431 |
| 5,419,218 | 5/1995 | Asano et al. | 60/431 |

FOREIGN PATENT DOCUMENTS

| | | |
|---|---|---|
| 62-31660 | 7/1982 | Japan . |
| 1-106741 | 4/1989 | Japan . |
| 4-191558 | 7/1992 | Japan . |

Primary Examiner—F. Daniel Lopez
Attorney, Agent, or Firm—Armstrong, Westerman, Hattori, McLeland & Naughton

[57] ABSTRACT

A target engine revolution speed is calculated based on the throttle position of an engine such that the amount of change in the target engine revolution speed with respect to time is limited. According to the target engine revolution speed thus calculated, a target motor speed ratio, which is a target value for the ratio of the revolution speed of a motor in a hydrostatic transmission unit to the revolution speed of the engine, is set. With this target motor speed ratio, the angle of at least either of discharge controlling swash plates is adjusted.

5 Claims, 7 Drawing Sheets

SYSTEM FOR CONTROLLING A HYDROSTATIC-MECHANICAL TRANSMISSION AT THE TIME OF VEHICLE ACCELERATION OR DECELERATION

BACKGROUND OF THE INVENTION (1) Field of the Invention

The invention relates to a system for controlling a hydrostatic-mechanical transmission at the time of vehicle acceleration or deceleration, that is suited for use in a tracklaying vehicle such as bulldozers, and more particularly, to a technique for reducing shocks occurring at the time of vehicle acceleration or deceleration.

(2) Description of the Prior Art One of such control systems for hydrostatic-mechanical transmissions is disclosed in Japanese Patent Publication No. 62-31660 (1987). According to the system taught by this publication, the angle of a swash plate for controlling the discharge of a pump in the hydrostatic transmission unit is adjusted according to the difference between a target engine revolution speed calculated from a throttle position and an actual engine revolution speed so as to make the actual engine revolution speed close to the target engine revolution speed.

SUMMARY OF THE INVENTION

The prior art control system described above, however, exhibits poor response because of its feedback control in which the difference between actual and target engine revolution speeds is used to obtain an amount that adjusts the swash plate for controlling the discharge of a pump in the hydrostatic transmission unit.

In order to solve this problem, we have proposed a high-response control system for hydrostatic-mechanical transmissions in Japanese Patent Application No. 2-323930 (1990) (now published as Japanese Patent Publication Laid Open No. 4-191558 (1992)), which is capable of immediately adjusting the revolution speed of the power source to a target revolution speed in response to a change in the position of the throttle. In this control system, in addition to a target revolution speed for the power source (i.e., target engine revolution speed) computed in response to a change in the position of the throttle, an actual speed ratio e is computed from an actual motor speed ratio $e_m$ (i.e., the ratio of the actual revolution speed $n_m$ of the motor for the hydrostatic transmission unit to the actual revolution speed (=actual engine revolution speed) $n_E$ of the power source). Those target engine revolution speed $N_E$, actual speed ratio e and actual engine revolution speed $n_E$ are then substituted in the following equation, thereby obtaining a target speed ratio E.

$$E = e + k(n_E - N_E) \quad (1)$$

A target motor speed ratio $E_m$ is obtained from the target speed ratio E in accordance with the present speed range selected in the mechanical transmission unit, and then, the angle of the swash plate for controlling the discharge of the pump in the hydrostatic transmission unit is controlled by feedforward control in which the target motor speed ratio $E_m$ is used.

In a vehicle employing the control system disclosed in the above publication, when the vehicle is accelerated by operating the throttle lever, the value of the target engine revolution speed $N_E$ is immediately computed according to the lever operation, but the actual engine revolution speed $n_E$ does not quickly respond to the lever operation because it is affected, for example, by the inertia of the engine. In such a situation, the value of $(n_E - N_E)$ in the equation (1) becomes negative, so that the target speed ratio E initially drops. This means that vehicle speed initially drops even if the opening of the throttle is increased in order to accelerate the vehicle and the vehicle is not accelerated until the actual engine revolution speed $n_E$ increases.

Similarly, when the vehicle is decelerated, the value of $(n_E - N_E)$ in the equation (1) becomes positive, thereby increasing the target speed ratio E initially. Vehicle speed once increases accordingly and the vehicle is decelerated after the actual engine revolution speed $n_E$ has dropped.

As has been described, the vehicle suffers from the problem that its movement cannot follow the operation of the throttle lever handled by the operator at the time of acceleration or deceleration, and in consequence, smooth acceleration and deceleration cannot be achieved.

The present invention has been made in consideration of the above problem and one of the objects of the invention is therefore to provide a control system for use in a vehicle incorporating a hydrostatic-mechanical transmission, which has the capability of allowing the vehicle to perform smooth acceleration and deceleration in response to the operation by the operator.

Figure 1:
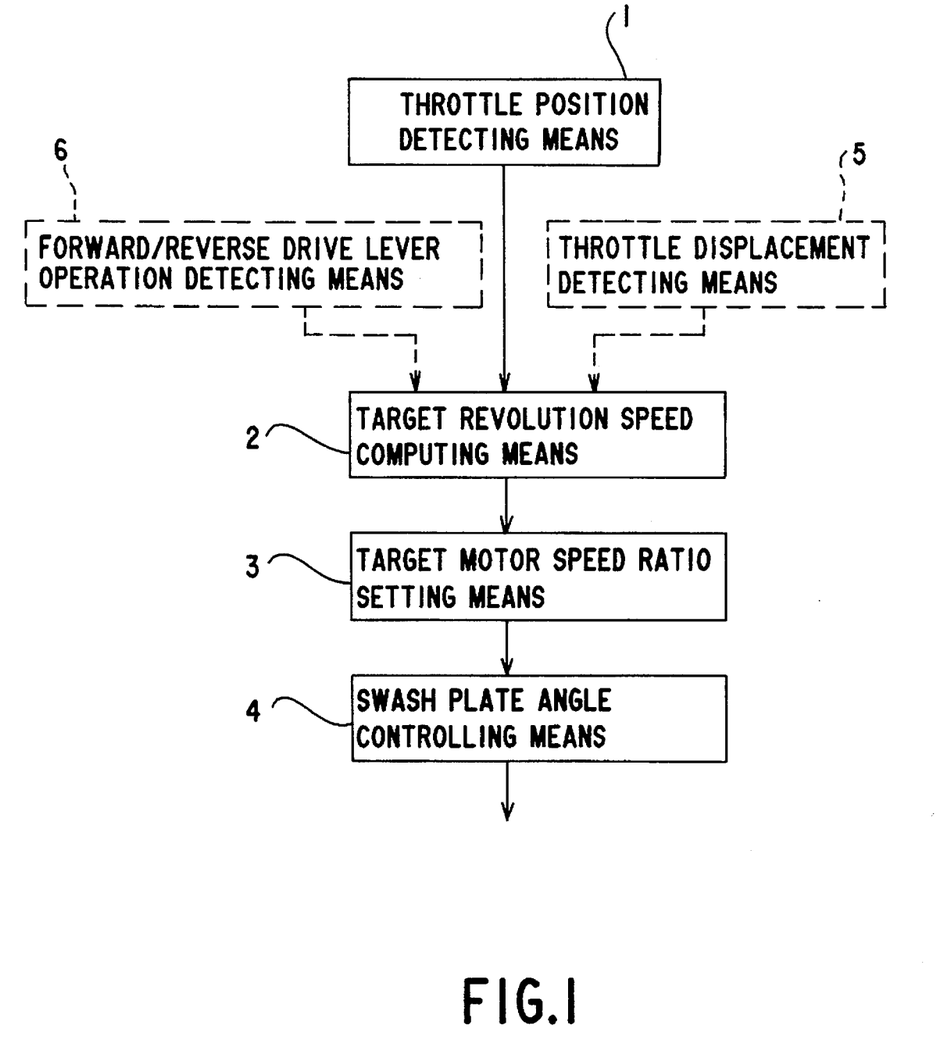
FIG. 1 is a diagram showing the principle of the invention.

In order to accomplish this object, there is provided, according to the invention, a system for controlling a hydrostatic-mechanical transmission at the time of vehicle acceleration or deceleration, the transmission being equipped with a mechanical transmission unit actuated through an input shaft connectable to a power source; a hydrostatic transmission unit which is connectable to the input shaft and comprises a pump and motor having their respective discharge controlling swash plates, the angle of at least either of the swash plates being variable; and a differential unit for actuating both the mechanical transmission unit and the hydrostatic transmission unit by connecting an output shaft thereto, the control system comprising as shown in the principle diagram of FIG. 1:

(a) throttle position detecting means (1) for detecting the position of a throttle in relation to the power source;

(b) target revolution speed computing means (2) for computing a target revolution speed for the power source in accordance with the position of the throttle detected by the throttle position detecting means (1), limiting the amount of change in the target revolution speed with respect to time;

(c) target motor speed ratio setting means (3) for setting a target motor speed ratio, which is a target value for the ratio of the revolution speed of the motor in the hydrostatic transmission unit to the revolution speed of the power source, in accordance with the target revolution speed computed by the target revolution speed computing means (2); and (d) swash plate angle controlling means (4) for controlling the angle of at least either of the discharge controlling swash plates in accordance with the target motor speed ratio set by the target motor speed ratio setting means (3).

In the control system of the invention, when the throttle position detecting means (1) detects the position of the throttle in relation to the power source, the target revolution speed computing means (2) computes a target revolution speed for the power source such that the amount of change in the target revolution speed with respect to time is limited. According to the target revolution speed thus computed, the target motor speed ratio setting means (3) sets a target motor speed ratio (i.e., a target value for the ratio of the revolution speed of the motor in the hydrostatic transmission unit to the revolution speed of the power source). Then, the swash plate angle controlling means (4) controls the angle of at least either of the discharge controlling swash plates based on the target motor speed ratio. With such arrangement, the amount of change in the target revolution speed for the power source with respect to time is limited according to the position of the throttle, so that the target revolution speed is prevented from being changed more abruptly than the actual revolution speed of the power source which is changed by the operation of the throttle by the operator. This enables smooth acceleration and deceleration in response to the operation by the operator. Furthermore, acceleration and deceleration can be readily performed when the throttle is quickly operated, which contributes to the improvement of the acceleration and deceleration capability of the vehicle.

Preferably, the target revolution speed computing means (2) limits the amount of change in the target revolution speed with respect to time, according to whether the vehicle is in an accelerated state or decelerated state and according to the value of the target revolution speed.

Preferably, the target revolution speed computing means (2) computes a target revolution speed for the power source such that the target revolution speed does not exceed the actual revolution speed of the power source when the vehicle is accelerated and such that it does not fall below the actual revolution speed of the power source when the vehicle is decelerated. This prevents such an undesirable situation in which vehicle speed once drops at the time of acceleration or once increases at the time of deceleration, even if the actual revolution speed does not immediately follow throttle operation.

Preferably, the control system of the invention further includes throttle displacement detecting means (5) for detecting the amount of displacement of the throttle with respect to time. When the throttle displacement detecting means (5) detects that the throttle has been quickly operated, the target revolution speed computing means (2) sets the target revolution speed for the power source to a value which is calculated according to the actual revolution speed of the power source. This speeds up acceleration and deceleration at the time of quick throttle operation, contributing to the improvement of acceleration and deceleration capability.

It is preferable that the control system of the invention further includes forward/reverse drive lever operation detecting means (6) for detecting that the forward/reverse drive lever has been operated. When this means (6) detects that the forward/reverse drive lever has been shifted from the neutral position to the forward drive position or reverse drive position, the target revolution speed computing means (2) sets the target revolution speed for the power source to a small value which is calculated according to the actual revolution speed of the power source. This makes it possible to reduce the target revolution speed once, thereby increasing the acceleration rate, if the forward/reverse drive lever is operated when the engine is in its "full-throttle" state.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention, and wherein:

FIGS. 1 to 8 provide illustrations of a system for controlling a hydrostatic-mechanical transmission at the time of vehicle acceleration or deceleration according to a preferred embodiment of the invention;

DESCRIPTION OF THE PREFERRED EMBODIMENT

Now, reference will be made to the accompanying drawings for describing a preferred embodiment of a system for controlling a hydrostatic-mechanical transmission at the time of vehicle acceleration or deceleration according to the invention.

Figure 2:
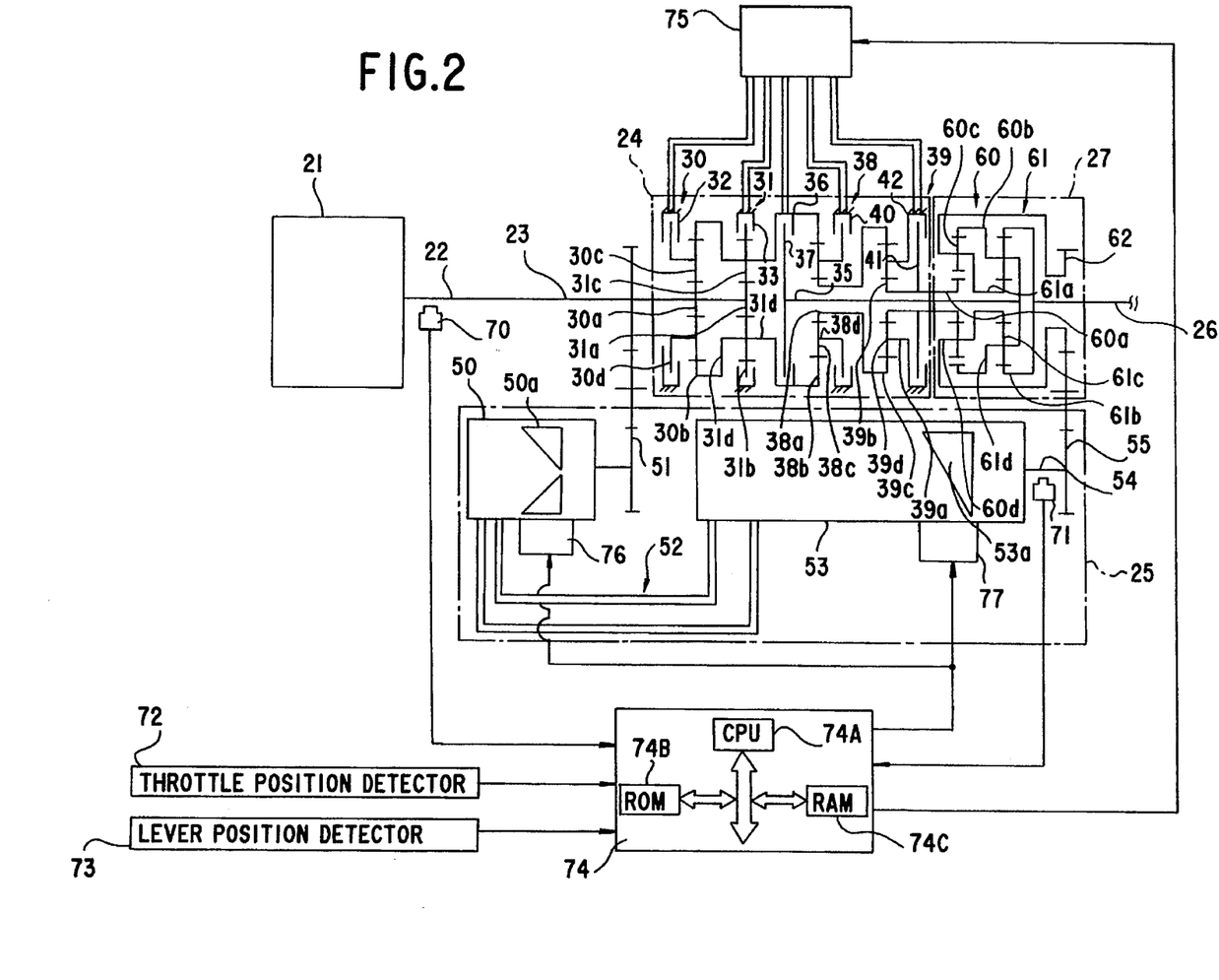
FIG. 2 is a diagram showing the structure of the hydrostatic-mechanical transmission according to one embodiment of the invention.

In FIG. 2, there are provided a mechanical transmission unit 24 which includes a gear box for providing three forward speeds and three reverse speeds, and a hydrostatic transmission unit 25 having a hydraulic pump-motor. These units 24 and 25 are connected to an input shaft 23 in such a manner that power transmitted from an engine 21 can be split, and the input shaft 23 is coaxially connected to an output shaft 22 of the engine 21 which is employed as one example of the power source of the invention. There is also provided a differential unit 27 that selectively connects an output shaft 26 to both the mechanical transmission unit 24 and the hydrostatic transmission unit 25, or to the hydrostatic transmission unit 25 only, for driving.

The mechanical transmission unit 24, hydrostatic transmission unit 25 and differential unit 27 will be hereinafter described in that order.

(1) Mechanical transmission unit 24

Referring to FIG. 2, the input shaft 23 is provided with a reverse planetary gear train 31) and a forward planetary gear train 31. The gear trains 30 and 31 are of the single planetary type and are aligned in an axial direction of the input shaft 23 in this order when enumerating from the left. The reverse planetary gear train 30 is composed of a sun gear 30a fixedly attached to the input shaft 23; a ring gear 30b positioned outside the sun gear 30a; a planet gear 30c that is in mesh with the gears 30a and 30b, being positioned therebetween; and a planet carrier 30d that is for the planet gear 30c and can be hydraulically braked by a reverse hydraulic clutch 32. Similarly, the forward planetary gear train 31 is composed of a sun gear 31a fixedly attached to the input shaft 23; a ring gear 31b that is positioned outside the sun gear 31a and can be hydraulically braked by a forward hydraulic clutch 33; a planet gear 31c that is in mesh with the gears 31a and 31b, being positioned therebetween; and a planet carrier 31d that is for the planet gear 31c and is integral with the ring gear 30b of the reverse planetary gear train 30.

There is provided an intermediate shaft 35 positioned coaxially with and in an extending direction of the input shaft 23. In FIG. 2, the intermediate shaft 35 is provided, at the left end thereof, with a clutch plate 37 that is hydraulically connectable by a 2nd-speed hydraulic clutch 36. The 2nd-speed hydraulic clutch 36 is formed integrally with the planet carrier 31d of the forward planetary gear train 31. The intermediate shaft 35 is also provided with a first 3rd-speed planetary gear train 38 and a second 3rd-speed planetary gear train 39. The gear trains 38 and 39 are of the single planetary type and are aligned in an axial direction of the intermediate shaft 35 in this order when enumerating from the left of FIG. 2.

The first 3rd-speed planetary gear train 38 is composed of a sun gear 38a rotatably supported by the intermediate shaft 35; a ring gear 38b that is positioned outside the sun gear 38a, being integral with the planet carrier 31d of the forward planetary gear train 31 and the 2nd-speed hydraulic clutch 36; a planet gear 38c that is in mesh with the gears 38a and 38b, being positioned therebetween; and a planet carrier 38d that is for the planet gear 38c and can be hydraulically braked by a 3rd-speed hydraulic clutch 40. Similarly, the second 3rd-speed planetary gear train 39 is composed of a sun gear 39b that is rotatably supported by the intermediate shaft 35, being integral with a clutch plate 41; a ring gear 39c that is positioned outside the sun gear 39b, being integral with the sun gear 38a of the first 3rd-speed planetary gear train 38; a planet gear 39d that is in mesh with the gears 39b and 39c, being positioned therebetween; and a fixed planet carrier 39e that is for the planet gear 39d and is integral with a 1st-speed hydraulic clutch 42 for hydraulically connecting the clutch plate 41.

(2) Hydrostatic transmission unit 25

The input shaft 23 is coupled through a gear train 51 to a variable displacement pump 50 having a discharge controlling variable-angle swash plate 50a which can be inclined both in the positive and negative directions. The variable displacement pump 50 is connected, through a pair of conduits 52 consisting of an outgoing path and a return path, to a variable displacement motor 53 having a discharge controlling variable-angle swash plate 53a which can be inclined in one direction. The variable displacement motor 53 has an output shaft 54 connected to a gear train 55. The discharge controlling variable-angle swash plates 50a and 53a provided in the variable displacement pump 50 and the variable displacement motor 53 are designed such that the revolution speed of the variable displacement pump 50 and that of the variable displacement motor 53 vary according to variations in the angles of the discharge controlling variable-angle swash plates 50a and 53a, as described below.

The revolution speed of the variable displacement pump 50 is specified, and the discharge controlling variable-angle swash plate 53a of the variable displacement motor 53 is inclined at a maximum tilt angle. In the above condition, as the tilt angle of the discharge controlling variable-angle swash plate 50a of the variable displacement pump 50 is inclined from zero in the positive direction, the revolution speed of the variable displacement motor 53 increases from zero in the positive direction. Then, the tilt angle of the discharge controlling variable-angle swash plate 50a of the variable displacement pump 50 is set to a maximum positive value. In this condition, as the tilt angle of the discharge controlling variable-angle swash plate 53a of the variable displacement motor 53 is decreased, the revolution speed of the variable displacement motor 53 further increases in the positive direction.

On the other hand, as the tilt angle of time discharge controlling variable-angle swash plate 50a of the variable displacement pump 50 is inclined from zero in the negative direction with the discharge controlling variable-angle swash plate 53a of the variable displacement motor 53 being inclined at a maximum tilt angle, the revolution speed of the variable displacement motor 53 decreases from zero in the negative direction. Then, the tilt angle of the discharge controlling variable-angle swash plate 50a of the variable displacement pump 50 is set to a maximum negative value. In this condition, as the tilt angle of the discharge controlling variable-angle swash plate 53a of the variable displacement motor 53 is decreased, the revolution speed of the variable displacement motor 53 further decreases in the negative direction.

(3) Differential unit 27 Referring to FIG. 2, the intermediate shaft 35 is provided, at the right end thereof, with a first differential planetary gear train of the double planetary type and a second differential planetary, gear train 61 of the single planetary type. These gear trains 60 and 61 are aligned coaxially with and in an extending direction of the intermediate shaft 35 in this order when enumerating from the left. The first differential planetary gear train 60 is composed of a sun gear 60a that is rotatably supported by the intermediate shaft 35, being integral with the sun gear 39b of the second 3rd-speed planetary gear train 39 and the clutch plate 41; a ring gear 60b positioned outside the sun gear 60a; a planet gear 60c that is in mesh with either of the gears 60a and 60b, being positioned therebetween; and a planet carrier 60d that is for the planet gear 60c and is integral with an input gear 62 connected through the gear train 55 to the output shaft 54 of the variable displacement motor 53 in the hydrostatic transmission unit 25. Similarly, the second differential planetary gear train 61 is composed of a sun gear 61a that is rotatably supported by the intermediate shaft 35, being integral with the planet carrier 60d of the first differential planetary gear train 60; a ring gear 61b that is positioned outside the sun gear 61a, being integral with the output shaft 26 positioned (at the right hand in FIG. 2) coaxially with and in an extending direction of the intermediate shaft 35; a planet gear 61c that is in mesh with the gears 61a and 61b, being positioned therebetween; and a planet carrier 61d that is for the planet gear 61c and is integral with the ring gear 60b of the first differential planetary gear train 60 and the intermediate shaft 35.

Figure 4:
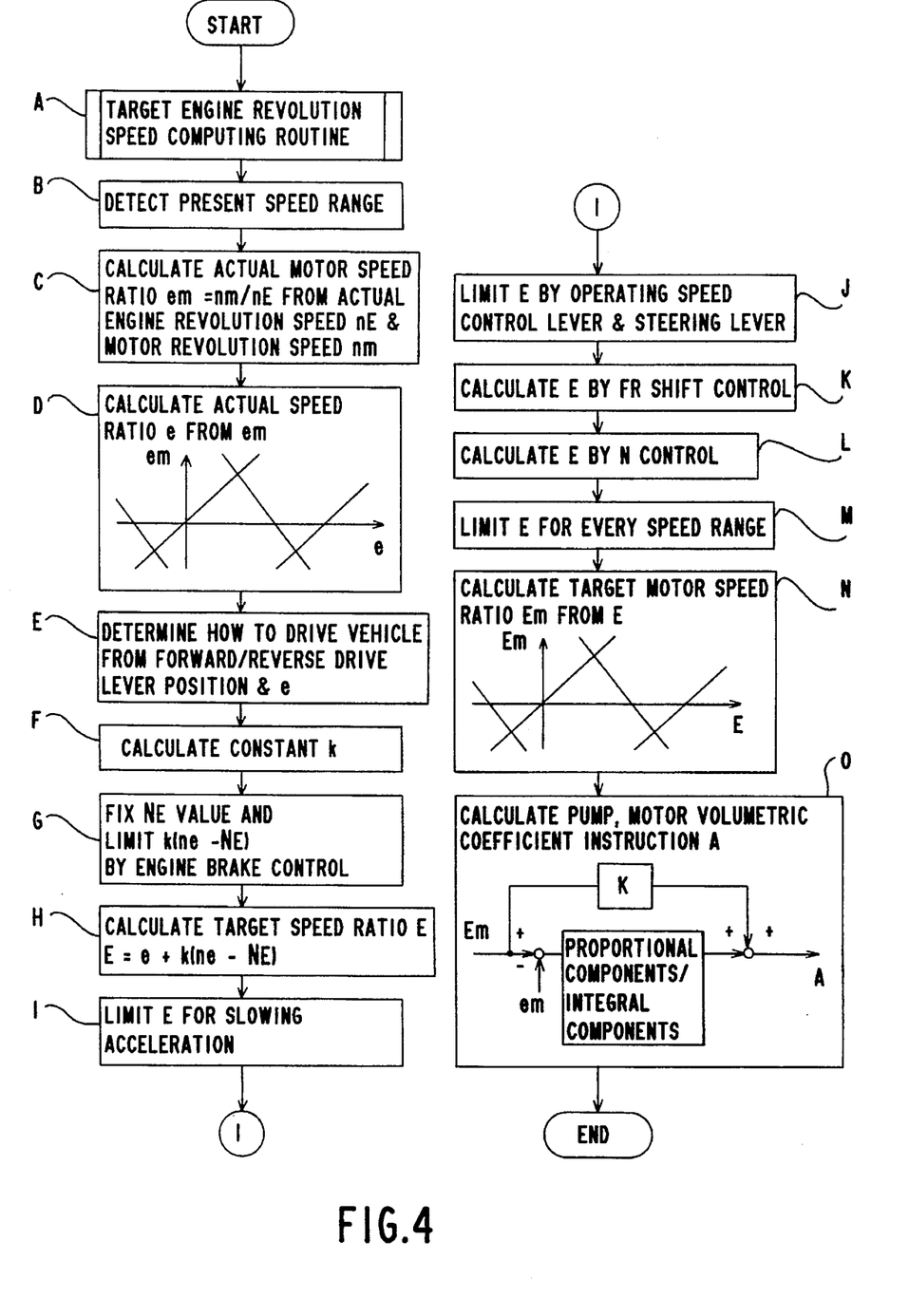
FIG. 4 is a flow chart of engine revolution speed control.

There will be given an explanation on the mechanical operations of the mechanical transmission unit 24, hydrostatic transmission unit 25 and differential unit 27. FIG. 4 shows the relationship between speed ratio and motor speed ratio in the respective speed ranges (i.e., 1st forward speed (F1); 2nd forward speed (F2); 3rd forward speed (F3); 1st reverse speed (R1); 2nd reverse speed (R2); and 3rd reverse speed (R3)). Note that the above speed ratio is the ratio of the revolution speed of the output shaft 26 to the revolution speed of the output shaft 22 of the engine 21 (=the revolution speed of the engine) and the above motor speed ratio is the ratio of the revolution speed of the output shaft 54 of the variable displacement motor 53 (=the revolution speed of the motor) to the revolution speed of the output shaft 22 of the engine 21 (=the revolution speed of the engine).

(i) 1st forward speed (F1) and 1st reverse speed (R1):

Only the 1st-speed hydraulic clutch 42 is engaged. The engagement of the clutch 42 causes the sun gear 60a of the first differential planetary gear train 60 to be hydraulically braked through the clutch plate 41 and causes the intermediate shaft 35 to be in a freely rotated state. Accordingly, only the torque of the variable displacement hydraulic motor 53 in the hydrostatic transmission unit 25 is transmitted to the output shaft 54 of the variable displacement hydraulic motor 53; the gear train 55; the input gear 62, the planet carrier 60d, the planet gear 60c and the ring gear 60b of the first differential planetary gear train 60, the planet carrier 61d, the planet gear 61c and the ring gear 61b of the second differential gear train 61 in the differential unit 27; and the output shaft 26 in that order. In short, the output shaft 26 is driven, being connected only to the hydrostatic transmission unit 25 by means of the differential unit 27.

As the motor speed ratio is thus increased from zero in the positive direction, the revolution speed of the output shaft 26 increases from zero in the positive direction. On the other hand, as the motor speed ratio decreases from zero in the negative direction, the revolution speed of the output shaft 26 also decreases from zero in the negative direction. Thus, the speed ratio is infinitely varied both in the positive and negative directions within a specified range.

In 1st forward speed (F1) and 1st reverse speed (R1), the 2nd-speed hydraulic clutch 36 may be engaged, or disengaged. However, when taking into account the case where the vehicle may be shifted to 2nd forward speed (F2) or 2nd reverse speed (R2) by clutch operation, the 2nd-speed hydraulic clutch 36 is preferably engaged.

In 1st speed, when the revolution speed of the output shaft 26 increases in the positive direction and the speed ratio is a specified positive value a, the relative revolution speed of the forward hydraulic clutch 33 in relation to the ring gear 31b of the forward planetary gear train 31 becomes zero. In this condition, if the forward hydraulic clutch 33 is engaged and the 1st-speed hydraulic clutch 42 is disengaged, 2nd forward speed (F2) will be obtained. At that time, the 2nd-speed hydraulic clutch 36 is engaged.

In 1st speed, when the revolution speed of the output shaft 26 decreases in the negative direction and the speed ratio is a specified negative value b, the relative revolution speed of the reverse hydraulic clutch 32 in relation to the planet carrier 30d of the reverse planetary gear train 30 becomes zero. In this condition, if the reverse hydraulic clutch 32 is engaged and the 1st-speed hydraulic clutch 42 is disengaged like the above case, 2nd reverse speed (R2) will be obtained. At that time, the 2nd-speed hydraulic clutch 36 is engaged.

(ii) 2nd forward speed (F2)

Since the clutch plate 37 is hydraulically connected by the engagement of the 2nd-speed hydraulic clutch 36 and the ring gear 31b of the forward planetary gear train 31 is hydraulically braked by the engagement of the forward hydraulic clutch 33, the torque of the input shaft 23 is transmitted to the forward planetary gear train 31, the 2nd-speed hydraulic clutch 36 and the intermediate shaft 35 in the mechanical transmission unit 24, and then to the second differential planetary gear train 61 in the differential unit 27. During the transmission, the revolution speed is reduced. The torque of the variable displacement motor 53 in the hydrostatic transmission unit 25 is also transmitted to the output shaft 54 of the variable displacement motor 53, the gear train 55, the input gear 62, the planet carrier 60d of the first differential planetary gear train 60 and then to the second differential planetary gear train 61 in the differential unit 27, while the revolution speed being reduced. The second differential planetary gear train 61 connects the mechanical transmission unit 24 and the hydrostatic transmission unit 25, whereby their revolution speeds are combined to drive the output shaft 26.

Thus, the motor speed ratio decreases thereby increasing the revolution speed of the output shaft 26 in the positive direction.

When the motor speed ratio is positive in 2nd forward speed (F2), part of torque from the second differential planetary gear train 61 in the differential unit 27 flows backwardly to the input gear 62 through the planet gear 61c and the sun gear 61a of the second differential planetary gear train 61 and the first differential planetary gear train 60 so that the variable displacement motor 53 performs its pumping operation. The pumping operation of the variable displacement motor 53 causes the variable displacement pump 50 to be driven, and the torque of the variable displacement pump 50 is transmitted through the gear train 51 to the input shaft 23 where the torque is combined with the torque of the engine 21.

When the motor speed ratio is negative on the other hand, part of the torque of the input shaft 23 drives the variable displacement pump 50 through the gear train 51. The actuation of the variable displacement pump 50 actuates the variable displacement motor 53 whose torque is transmitted to the gear train 55, the input gear 62 etc. in the differential unit 27, and then to the second differential planetary gear train 61 in the differential unit 27. At the second differential planetary gear train 61, the transmitted torque is combined with torque from the mechanical transmission unit 24 to drive the output shaft 26.

In 2nd forward speed (F2), when the speed ratio is increased to a specified value c, the relative revolution speed of the 3rd-speed hydraulic clutch 40 in relation to the planet carrier 38d of the first 3rd-speed planetary gear train 38 becomes zero. In this condition, if the 3rd-speed hydraulic clutch 40 is engaged and the 2nd-speed hydraulic clutch 36 is disengaged, 3rd forward speed (F3) will be obtained.

In 2nd forward speed (F2), when the speed ratio decreases from a higher value to the specified value a, the relative revolution speed of the 1st-speed hydraulic clutch 42 in relation to the clutch plate 41 becomes zero. In this condition, if the 1st-speed hydraulic clutch 42 is engaged and the forward hydraulic clutch 33 is disengaged, 1st forward speed (F1) will be obtained.

(iii) 3rd forward speed (F3)

Since the planet carrier 38d of the first 3rd-speed planetary gear train 38 is hydraulically braked by the engagement of the 3rd-speed hydraulic clutch 40 and the ring gear 31b of the forward planetary gear train 31 is hydraulically braked by the engagement of the forward hydraulic clutch 33, the torque of the input shaft 23 is transmitted through the forward planetary gear train 31, the 2nd-speed hydraulic clutch 36, the first 3rd-speed planetary gear train 38 and the second 3rd-speed planetary gear train 39 in the mechanical transmission unit 24 to the first and second differential planetary gear trains 60 and 61 in the differential unit 27, whilst the revolution speed being reduced. Also, the torque of the variable displacement motor 53 in the hydrostatic transmission unit 25 is transmitted through the output shaft 54 of the variable displacement motor 53 and the gear train 55 to the first and second differential planetary gear trains 60 and 61 in the differential unit 27, whilst the revolution speed being reduced. The first and second differential planetary gear trains 60 and 61 connect the mechanical transmission unit 24 and the hydrostatic transmission unit 25, whereby their revolution speeds are combined to drive the output shaft 26.

As the motor speed ratio is thus increased, the revolution speed of the output shaft 26 increases in the positive direction.

When the motor speed ratio is negative in 3rd forward speed (F3), part of torque from the first and second differential planetary gear trains 60 and 61 in the differential unit 27 flows backwardly to the input gear 62 so that the variable displacement motor 53 performs its pumping operation and the torque of the variable displacement motor 53 is transmitted, as described above, through the variable displacement pump 50 and the gear train 51 to the input shaft 23 where the transmitted torque is combined with the torque of the engine 21.

When the motor speed ratio is positive on the other hand, part of the torque of the input shaft 23 drives the variable displacement pump 50 through the gear train .51, and the torque of the variable displacement motor 53 is transmitted, as described above, through the gear train 55 and the input gear 62 etc. in the differential unit 27 to the first and second differential planetary gear trains 60 and 61 in the differential unit 27. At the first and second differential planetary gear trains 60 and 61, the torque is combined with torque from the mechanical transmission unit 24 to drive the output shaft 26.

In 3rd forward speed (F3), when the speed ratio decreases from a higher value to the specified value c, the relative revolution speed of the 2nd-speed hydraulic clutch 36 in relation to the clutch plate 37 becomes zero. In this condition, if the 2nd-speed hydraulic clutch 36 is engaged and the 3rd-speed hydraulic clutch 40 is disengaged, 2nd forward speed (F2) will be obtained.

(iv) 2nd reverse speed (R2)

Since the clutch plate 37 is hydraulically connected by the engagement of the 2nd-speed hydraulic clutch 36 and the planet carrier 30d of the reverse planetary gear train 30 is hydraulically braked by the engagement of the reverse hydraulic clutch 32, the torque of the input shaft 23 is transmitted through the reverse planetary gear train 30, the 2nd-speed hydraulic clutch 36 and the intermediate shaft 35 in the mechanical transmission unit 24 to the second differential planetary gear train 61 in the differential unit 27, whilst the revolution speed being reduced. The torque of the variable displacement motor 53 in the hydrostatic transmission unit 25 is transmitted, as described above, through the output shaft 54 of the variable displacement motor 53, the gear train 55, the input gear 62 and the planet carrier 60d of the first differential planetary gear train 60 in the differential unit 27 to the second differential planetary gear train 61, whilst the revolution speed being reduced. The first differential planetary gear train 61 connects the mechanical transmission unit 24 and the hydrostatic transmission unit 25 thereby combining their revolution speeds to drive the output shaft 26.

As the motor speed ratio is increased accordingly, the revolution speed of the output shaft 26 decreases in the negative direction.

In 2nd reverse speed (R2), when the motor speed ratio is negative, part of torque from the second differential planetary gear train 61 in the differential unit 27 flows backwardly to the hydrostatic transmission unit 25 so that the variable displacement motor 53 performs its pumping operation. When the motor speed ratio is positive, the operation to be carried out is the same as that described in the case of 2nd forward speed (F2), except that a partial flow of the torque of the input shaft 23 toward the hydrostatic transmission unit 25 occurs.

In 2nd reverse speed (R2), when the speed ratio decreases from a higher value to a specified value d, the relative revolution speed of the 3rd-speed hydraulic clutch 40 in relation to the planet carrier 38d of the first 3rd-speed planetary gear train 38 becomes zero. In this condition, if the 3rd-speed hydraulic clutch 40 is engaged and the 2nd-speed hydraulic clutch 36 is disengaged, 3rd reverse speed (R3) will be obtained.

When the speed ratio is increased to the specified value b in 2nd reverse speed (R2), the relative revolution speed of the 1st-speed hydraulic clutch 42 in relation to the clutch plate 41 becomes zero. In this condition, if the 1st-speed hydraulic clutch 42 is engaged and the reverse hydraulic clutch 32 is disengaged, 1st reverse speed (R1) will be obtained.

(v) 3rd reverse speed (R3)

Since the planet carrier 38d of the first 3rd-speed planetary gear train 38 is hydraulically braked by the engagement of the 3rd-speed hydraulic clutch 40 and the planet carrier 30d of the reverse planetary gear train 30 is hydraulically braked by the engagement of the reverse hydraulic clutch 32, the torque of the input shaft 23 is transmitted through the reverse planetary gear train 30, the 2nd-speed hydraulic clutch 36, the first 3rd-speed planetary gear train 38 and the second 3rd-speed planetary gear train 39 in the mechanical transmission unit 24 to the first and second differential planetary gear trains 60 and 61 in the differential unit 27, while the revolution speed being reduced. Also, the torque of the variable displacement motor 53 in the hydrostatic transmission unit 25 is transmitted, as described above, through the output shaft 54 of the variable displacement motor 53 and the gear train 55 to the first and second differential planetary gear trains 60 and 61 in the differential unit 27, while the revolution speed being reduced. The first and second differential planetary gear trains 60 and 61 connect the mechanical transmission unit 24 and the hydrostatic transmission unit 25 thereby combining their revolution speeds to drive the output shaft 26.

As the motor speed ratio is decreased accordingly, the revolution speed of the output shaft 26 decreases in the negative direction.

In 3rd reverse speed (R3), when the motor speed ratio is positive, part of torque from the first and second differential planetary gear trains 60 and 61 in the differential unit 27 flows backwardly to the hydrostatic transmission unit 25 so that the variable displacenent motor 53 performs its pumping operation. When the motor speed ratio is negative, the operation to be carried out is the same as that described in the case of 3rd forward speed (F3), except that a partial flow of the torque of the input shaft 23 toward the hydrostatic transmission unit 25 occurs.

In 3rd reverse speed (R3), when the revolution speed ratio is increased to the specified value d, the relative revolution speed of the 2nd-speed hydraulic clutch 36 in relation to the clutch plate 37 becomes zero. In this condition, if the 2nd-speed hydraulic clutch 36 is engaged and the 3rd-speed hydraulic clutch 40 is disengaged, 2nd reverse speed (R2) will be obtained.

The operation for controlling the mechanical transmission unit 24 and the hydrostatic transmission unit 25 will be explained below.

In FIG. 2, the output shaft 22 of the engine 21 is provided with an engine revolution speed detector 70 for detecting the revolution speed of the output shaft 22 to detect the revolution speed $n_E$ of the engine 21, and the output shaft 54 of the variable displacement motor 53 in the hydrostatic transmission unit 25 is provided with a motor revolution speed detector 71 for detecting the revolution speed $n_m$ and revolution direction of the variable displacement motor 53. An engine throttle (not shown) is provided with a throttle position detector 72 for detecting the position X of the engine throttle manipulated. A change lever (not shown) is provided with a lever position detector 73 for detecting the lever position FNR (i.e., forward(F), neutral(N) or reverse(R)) of the change lever manipulated. The engine revolution speed detector 70, motor revolution speed detector 71, throttle position detector 72 and lever position detector 73 issue an engine revolution speed signal, motor revolution speed signal, throttle position signal and lever position signal respectively to a control unit 74.

The control unit 74 is composed of a central processing unit (CPU) 74A for executing a specified program, a read only memory (ROM) 74B for storing the specified program and various tables, and a random access memory (RAM)74C serving as a working memory necessary for executing the specified program. The control unit 74 executes arithmetic processing by executing the specified program in accordance with the engine revolution speed signal, motor revolution speed signal, throttle position signal and lever position signal, and issues a shift control signal to a shift valve 75. In response to the shift control signal, the shift valve 75 executes the above-described engagement/ disengagement of the reverse hydraulic clutch 32, forward hydraulic clutch 33, 2nd-speed hydraulic clutch 36, 3rd-speed hydraulic clutch 40 and 1st-speed hydraulic clutch 42. The control unit 74 also supplies an angle control signal to a valve 76 for changing the angle of the discharge controlling variable-angle swash plate 50a of the variable displacement pump 50 and to a valve 77 for changing the angle of the discharge controlling variable-angle swash plate 53a of the variable displacement motor 53, respectively.

A target engine revolution speed $N_E$ for the engine 21 is obtained according to the position X of the engine throttle and a control direction for speed ratio is obtained according to the lever position FNR of the change lever. Hence, speed ratio control is performed in the control unit 74 as shown in Table 1. This control is based on (i) the condition (positive, negative, or zero) of the actual speed ratio e; (ii) the relationship between the actual engine revolution speed $n_E$ that is obtained from the engine revolution target engine revolution speed $N_E$ that is obtained from the throttle speed signal from the engine revolution speed detector 70 and the position signal from the throttle position detector 72; and (iii) the lever position FNR obtained from the lever position signal from the lever position detector 73.

TABLE 1

| Actual Speed Ratio e | Relationship Between actual Engine Revolution Speed $N_E$ And Target Engine Revolution Speed $N_E$ | Lever Position FNR | Speed Ratio Control |
|---|---|---|---|
| ≧0 | $n_E > N_E$ | forward | increase to positive |
| >0 | $n_E < N_E$ | | decrease to zero |
| =0 | $n_E < N_E$ | | maintain at zero |
| ≧0 | $n_E = N_E$ | | maintain constant |
| <0 | $n_E \gtreqless N_E*$ | | increase to zero |
| >0 | $n_E \gtreqless N_E*$ | neutral | decrease to zero |

TABLE 1-continued

| Actual Speed Ratio e | Relationship Between actual Engine Revolution Speed $N_E$ And Target Engine Revolution Speed $N_E$ | Lever Position FNR | Speed Ratio Control |
|---|---|---|---|
| =0 | $n_E \gtreqless N_E*$ | | maintain at zero |
| <0 | $n_E \gtreqless N_E*$ | | increase to zero |
| ≦0 | $n_E > N_E$ | reverse | decrease to negative |
| <0 | $n_E < N_E$ | | increase to zero |
| =0 | $n_E < N_E$ | | maintain at zero |
| ≦0 | $n_E = N_E$ | | maintain constant |
| >0 | $n_E \gtreqless N_E*$ | | decrease to zero |

*all situations

With reference to the flow chart of FIG. 4 which shows a basic program, the engine revolution speed control that is performed by controlling speed ratio will be described in detail.

Figure 5A:
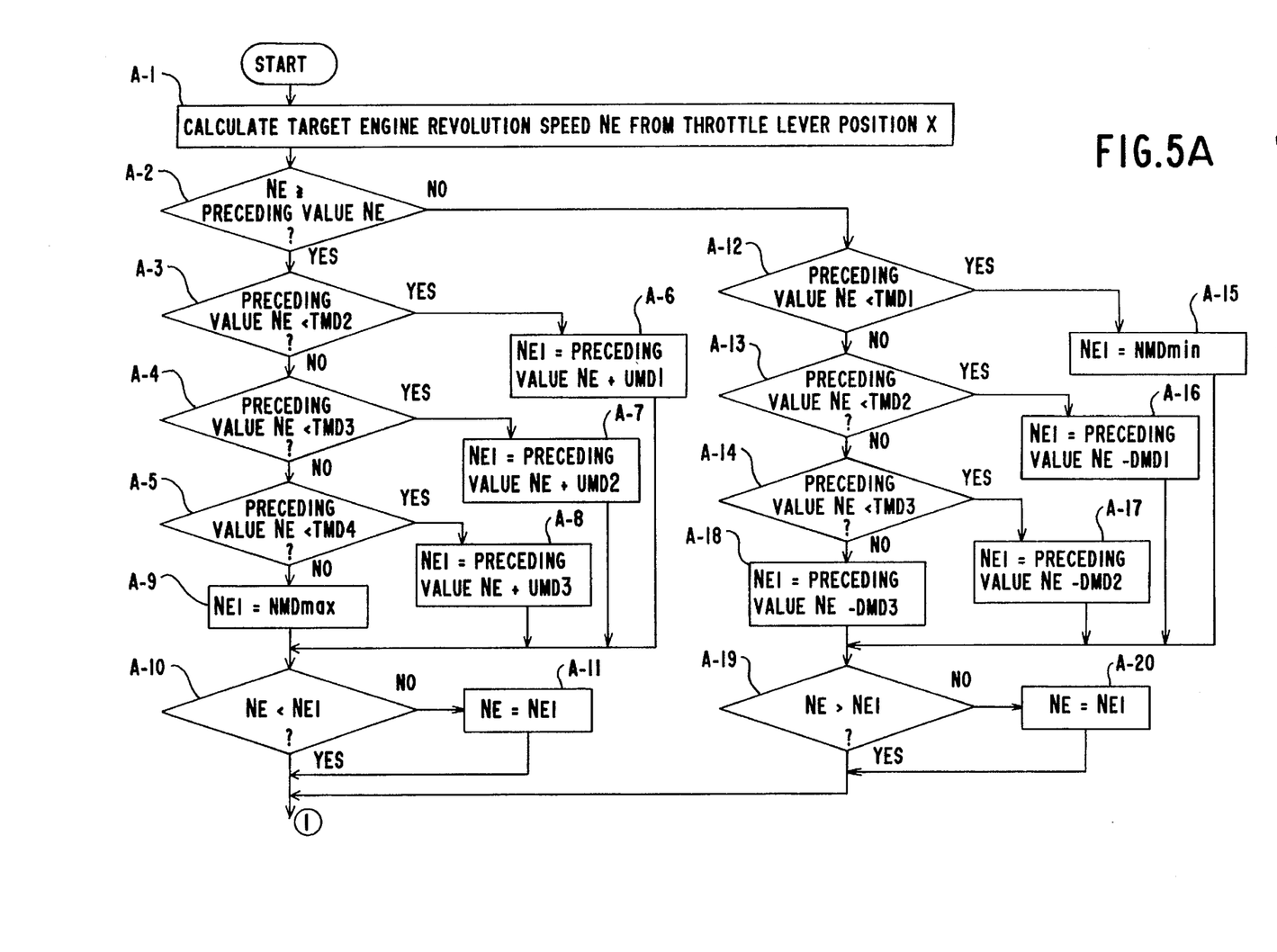
FIG. 5A and 5B is a flow chart of operation for computing a target engine revolution speed.
Figure 5B:
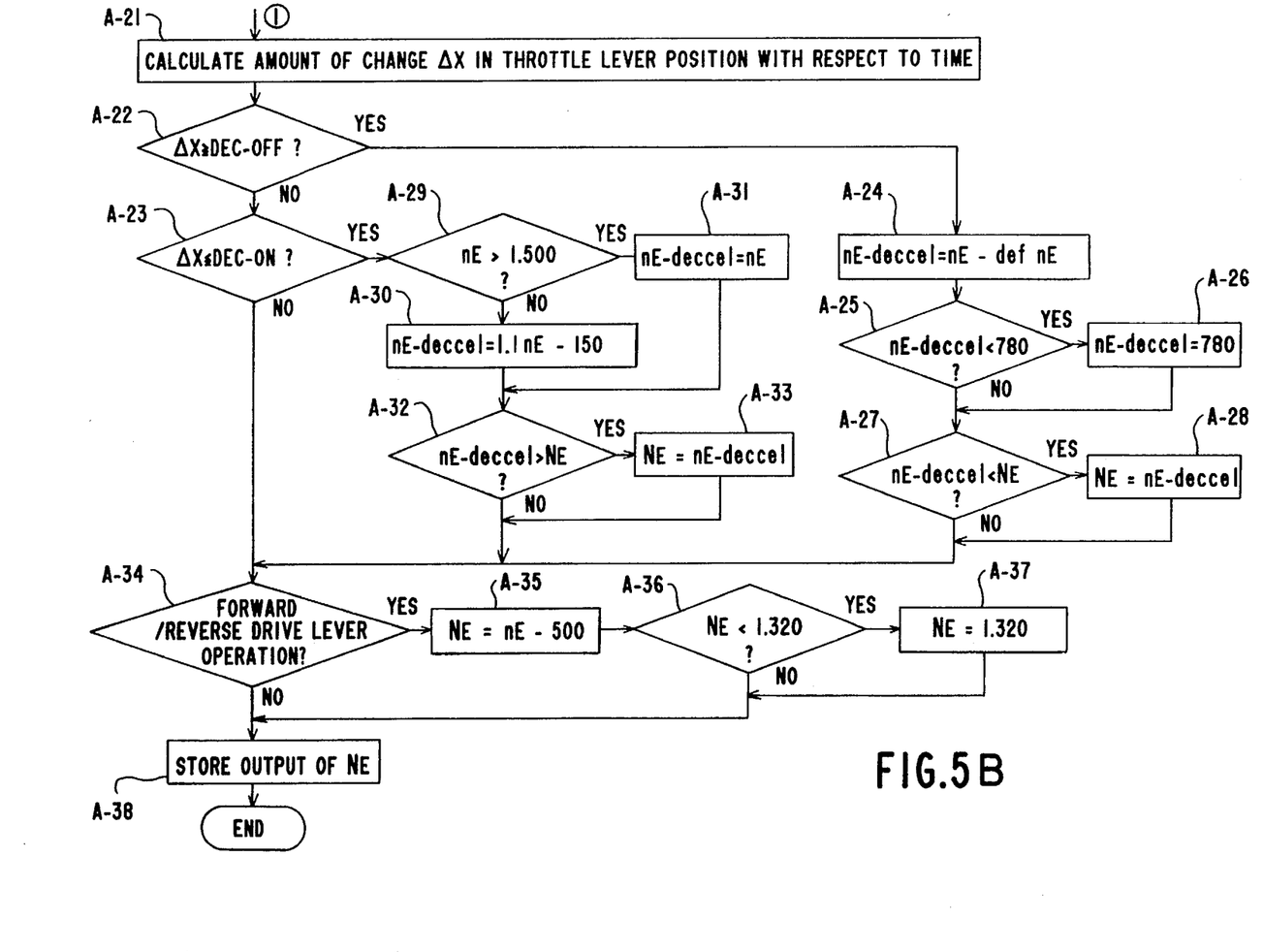

A: Target engine revolution speed computing routine: According to the throttle position signal from the throttle position detector 72, the target engine revolution speed $N_E$ of the engine 21 for the throttle position X is obtained through arithmetic operation. The details will be described later with reference to the flow chart of FIG. 5.

Figure 3:
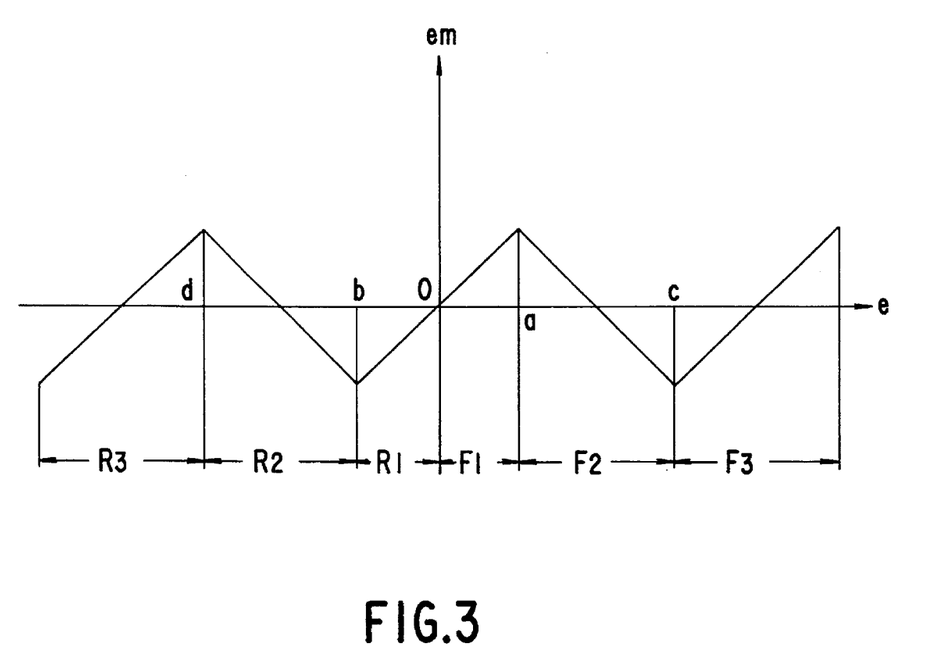
FIG. 3 is a graph of actual motor speed ratio verses actual speed ratio.

B–D: The speed range presently selected in the mechanical transmission unit 24 which is controlled by the control unit 74 with the help of the shift valve 75 is detected. From the present actual engine revolution speed $n_E$ indicated by the engine revolution speed signal from the engine revolution detector 70 and the present actual motor revolution speed $n_m$ indicated by the motor revolution speed signal from the motor revolution speed detector 71, an actual motor speed ratio $e_m$ (the ratio of the actual motor revolution speed $n_m$ to the actual engine revolution speed $n_E$ ($=n_m/n_E$)) is obtained by arithmetic operation. The present, actual speed ratio e is obtained by converting the actual motor speed ratio $e_m$ in accordance with the present speed range detected, by the use of the preliminarily stored characteristic function $e=f(e_m)$ or table. The characteristic function $e=f(e_m)$ is set in accordance with the characteristic curve (see FIG. 3) of the actual motor speed ratio $e_m$ plotted against the actual speed ratio e.

E: How the vehicle should be driven, namely, which of the following operations should be performed, is determined from the lever position signal from the lever position detector 73 and the present, actual speed ratio e.

(1) Forward moving or backward moving of the vehicle is maintained.

(2) The vehicle is gradually stopped by the engine brake (engine brake control).

(3) The vehicle is immediately stopped during forward or backward moving and then moved off again in a reverse direction (FR shift control).

(4) The vehicle is stopped (neutral control).

F: The value of a constant k (k represents the response of the transmission to a change in engine revolution and its unit is 1/rpm) is obtained to be substituted in the following equation (1) for obtaining a target speed ratio E which is used for slowing down the response to a change in load during digging operation in order to free the operator from extra blade operation for vehicle speed control.

G: In the case of the engine brake control mentioned above, the target engine revolution speed $N_E$ is fixed at a specified value (e.g., 2,200 rpm) which is more than the revolution speed of the engine in a full-throttle state (=2,100 rpm), so that vehicle speed decreases. In order to stop the vehicle smoothly, a restriction is placed on the speed reduction determined by $k(n_E-N_E)$, according to the presently selected speed range.

H: The target speed ratio E is obtained by substituting the above target engine revolution speed $N_E$, actual speed ratio e and actual engine revolution speed $n_E$ in the following equation (1).

$$E=e+k\ (n_E-N_E) \qquad (1)$$

I: The rate of change in the target speed ratio E with respect to time is limited. This decreases vehicle acceleration at the primary stage of digging and therefore allows the operator to be free from extra blade operation for vehicle speed control, particularly when digging ground that is too hard to strike into by the blade.

J: The target speed ratio E is limited by operating the speed control lever, and the target speed ratio E is also limited in a case, for example, in which the turning radius of the vehicle is reduced when the steering lever is operated excessively beyond a specified displacement range at the time of high-speed vehicle moving.

K: Sequential values for the target speed ratio E are so determined as to decrease step by step in order to immediately stop the vehicle at the time of the FR shift control.

L: The target speed ratio ti is fixed at zero in order to securely stop the vehicle at the time of the neutral control.

M: Since there is a limit in the range of the target speed ratio E for each speed range, the value of the target speed ratio E is limited for each speed range.

N: A target motor speed ratio $E_m$ is obtained by converting the target speed ratio E in accordance with the speed range presently selected by the mechanical transmission unit 24. This conversion is clone by the use of a characteristic function $E_m=f(E)$ or table which is a characteristic curve slimier to FIG. 3 and has been preset according to the characteristic curve of the target motor speed ratio $E_m$ plotted against the target speed ratio E.

O: An operation amount A is obtained from the target motor speed ratio $E_m$ and actual motor speed ratio $e_m$. Concretely, a feed forward amount $KE_m$ (K: feed forward coefficient) which is proportional to the target motor speed ratio $E_m$ is added to the sum of the proportional components and integral components of the difference ($=E_m-e_m$) between the target motor speed ratio $E_m$ and the actual motor speed ratio $e_m$, whereby the operation amount A is obtained. This operation amount A is released as an angle control signal to the angle changing valves 76 and 77.

Accordingly, the actual motor speed ratio $e_m$ is adjusted to be equal to the target motor speed ratio $E_m$ and the actual speed ratio e is adjusted to be equal to the target speed ratio E, so that the actual engine revolution speed $n_E$ is adjusted to be equal to the target engine revolution speed $N_E$ corresponding to the throttle position X of the engine throttle.

Referring to FIG. 5, the aforesaid target engine revolution speed computing routine (Step A) will be described in detail.

Figure 6:
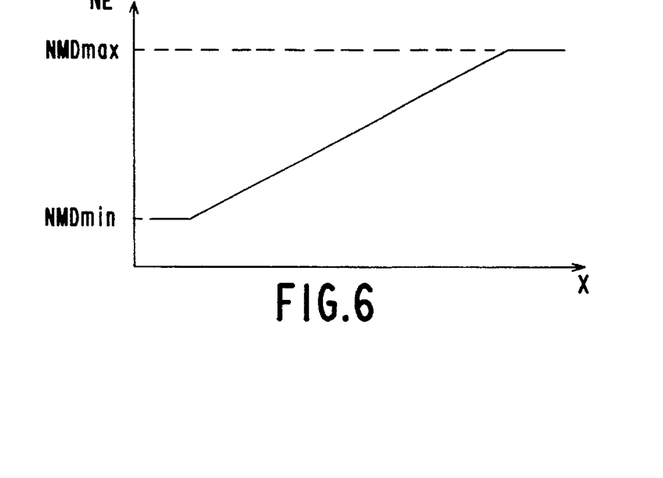
FIG. 6 is a graph showing the relationship between the opening of a throttle and target engine revolution speed.

A-1: According to the throttle position signal from the throttle position detector 72, the target engine revolution speed $N_E$ of the engine 21 for the throttle position X is obtained through arithmetic operation in which a preset characteristic function or table is used. This characteristic function or table is set, as shown in FIG. 6, based on the characteristic curve of the target engine revolution speed $N_E$ against the throttle position X. This characteristic curve is prepared from the characteristic curve of torque against the revolution speed of the engine 21.

A-2: To check whether the vehicle is being accelerated or decelerated, it is determined whether the present value of the target engine revolution speed $N_E$ obtained in Step A-1 is more than the preceding value of the target engine revolution speed $N_E$. If the present value $N_E \geq$ the preceding value $N_E$, the vehicle is in its accelerated state, and therefore the program proceeds to Step A-3. If the present value $N_E <$ the preceding value $N_E$, the vehicle is in its decelerated state so that the program proceeds to Step A-12.

A-3 to A-9: For limiting the amount of increase in the target engine revolution speed $N_E$ for each time during vehicle acceleration, the preceding value of the target engine revolution speed $N_E$ is compared to set values TMD2, TMD3, TMD4 (TMD2<TMD3<TMD4) and a value defined by $N_{E1}$ is determined. Specifically, the value $N_{E1}$ is set as follows (see FIG. 7).

Figure 7:
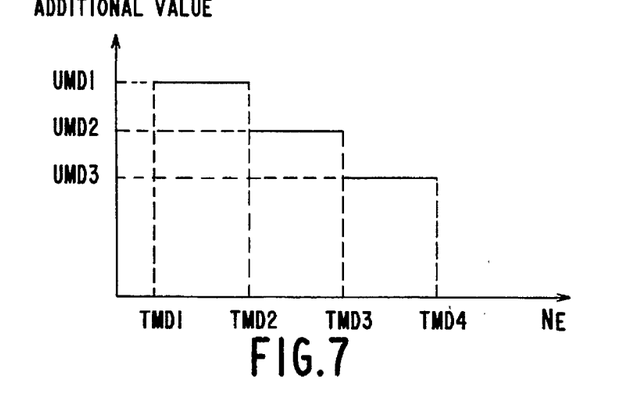
FIG. 7 is a graph showing the relationship between target engine revolution speed and its limit value (additional value)

When the preceding value $N_E<$TMD2:

$N_{E1}=$ the preceding value $N_E+UMD1$

When TMD2$\leq$the preceding value $N_E<$TMD3:

$N_{Eq}=$ the preceding value $N_E+UMD2$

When TMD3$\leq$the preceding value $N_E<$TMD4:

$N_{E1}=$ the preceding value $N_E+UMD3$

When the preceding value $N_E \geq$TMD4:

$N_{E1}=NMD_{max}$

The relationship among UMD1, UMD2 and UMD3 is described by UMD1>UMD2>UMD3, and $NMD_{max}$ is a maximum value for the target engine revolution speed $N_E$ (see FIG. 6).

A-10 to A-11: In order that the value $N_{E1}$ calculated in Steps A-3 to A-9 does not exceed the target engine revolution speed $N_E$ determined by the throttle position X, $N_E$ is compared to $N_{E1}$ and the smaller one of them is set as $N_E$. Then, the program proceeds to Step A-21.

A-12 to A-18: For limiting the amount of decrease in the target engine revolution speed $N_E$ for each time during vehicle deceleration, the preceding value of the target engine revolution speed $N_E$ is compared to set values TMD1, TMD2, TMD3 (TMD1<TMD2<TMD3), and a value defined by $N_{E1}$ is determined. Specifically, the value $N_{E1}$ is set as follows (see FIG. 8).

Figure 8:
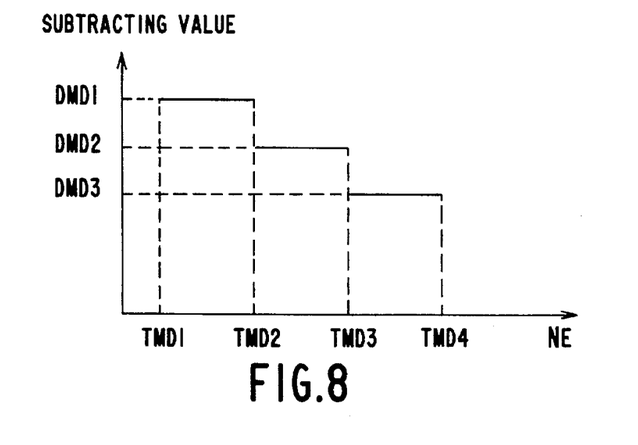
FIG. 8 is a graph showing the relationship between target engine revolution speed and its limit value (subtracting value).

When the preceding value $N_E<$TMD1:

$N_{E1}=NMD_{min}$

When TMD1$\leq$the preceding value $N_E<$TMD2:

$N_{E1}=$ the preceding value $N_E-DMD1$

When TMD2$\leq$the preceding value $N_E<$TMD3:

$N_{E1}=$ the preceding value $N_E-DMD2$

When the preceding value $N_E \geq$TMD3:

$N_{E1}=$ the preceding value $N_E-DMD3$

The relationship among DMD1, DMD2 and DMD3 is described by DMD1>DMD2>DMD3, and $NMD_{min}$ is a minimum value for the target engine revolution speed $N_E$ (see FIG. 6).

A-19 to A-20: In order that the value $N_{E1}$ calculated in Steps A-12 to A-18 does not fall below the target engine revolution speed $N_E$ determined by the throttle position X, $N_E$ is compared to $N_{E1}$ and the larger one of them is set as $N_E$. Then, the program proceeds to Step A-21.

A-21 to A-23: To check if the throttle lever has been abruptly operated, the amount $\Delta x$ of change in the throttle lever position with respect to time is calculated. If the amount $\Delta x$ is equal to a specified positive value (DEC-OFF) or more, it is then determined that the throttle lever has been abruptly operated for acceleration, and the program proceeds to Step A-24. If the amount $\Delta x$ is equal to a specified negative value (DEC-ON) or less, it is then determined that the throttle lever has been abruptly operated deceleration, and the program proceeds to Step A-29.

A-24 to A-28: Since abrupt operation of the throttle lever has been done for starting acceleration, a value $n_{E\text{-}deccel}$ is temporarily set in place of the target engine revolution speed $N_E$, and this value $n_{E\text{-}deccel}$ is obtained by subtracting a certain value $\text{defn}_E$ from the actual engine revolution speed $n_E$. Then, the value $n_{E\text{-}deccel}$ is so determined as not to be equal to 780 rpm or less, and the value $n_{E\text{-}deccel}$ is compared to the value $N_E$ which has been calculated in Steps A-10 and A-11. The smaller value obtained from the comparison is set as the target engine revolution speed $N_E$. With these steps, the target engine revolution speed $N_E$ is once set to a small value when the vehicle is abruptly accelerated so that the value of $(n_E - N_E)$ in the equation (1) (i.e., $E=e+k(n_E-N_E)$) becomes a large positive value, which contributes to the improvement of vehicle acceleration.

A-29 to A-33: Since abrupt operation of the throttle lever has been done for starting deceleration, a value $n_{E\text{-}deccel}$ is temporarily set in place of the target engine revolution speed $N_E$. In this temporal setting, it is checked whether the actual engine revolution speed $n_E$ exceeds 1,500 rpm, and if $n_E > 1,500$ rpm, the actual engine revolution speed $n_E$ itself is set as $n_{E\text{-}deccel}$. If $n_E \leq 1,500$ rpm, the value obtained from the equation $n_{E\text{-}deccel} = 1.1 n_E - 150$ is set as $n_{E\text{-}deccel}$. Then, the value $n_{E\text{-}deccel}$ is compared to the value $N_E$ which set as the target engine revolution speed $N_E$. With these steps, the has been calculated in Steps A-19 and A-20, and the larger one is target engine revolution speed $N_E$ is once set to a large value when the vehicle is abruptly decelerated so that the value of $(n_E - N_E)$ in the equation (1) (i.e., $E=e+k(n_E-N_E)$) becomes a large negative value, which contributes to the improvement of vehicle deceleration.

A-34 to A-37: It is checked whether the forward/reverse drive lever has been shifted, for example, from the neutral position to the forward drive position, that is, whether the vehicle is about to start off. If the forward/reverse drive lever has been operated, the value of the target engine revolution speed $N_E$ is determined from the equation $N_E = n_E - 500$. Then, it is checked whether $N_E$ is less than 1,320 rpm. If $N_E \geq 1,320$, that value is used as the value $N_E$, and if $N_E < 1,320$, $N_E$ is set to 1,320. With such arrangement, when the forward/reverse drive lever is operated with the engine in a full-throttle state, the value $(n_E - N_E)$ is increased by decreasing the target engine revolution speed $N_E$ once, so that the acceleration rate increases.

A-38: The output of the calculated target engine revolution speed $N_E$ is stored and the flow is completed. The stored value $N_E$ is used as the preceding value of the target engine revolution speed $N_E$ in the next cycle.

Although the above-described flow does not include the case where the forward/reverse drive lever has been shifted to the neutral position, if such a situation arises, the target engine revolution speed $N_E$ will be fixed at a value (=2,200 rpm) more than the revolution speed of the engine in a full-throttle state. With this arrangement, the value $(n_E - N_E)$ does not fail to become a negative value. In such a case, the vehicle is stopped by the engine brake (see the engine brake control in Step G).

As has been described earlier, in the target engine revolution speed computing routine, when the target engine revolution speed $N_E$ is determined from the throttle position x, the amount of increase in the target engine revolution speed $N_E$ with respect to time is limited at the time of vehicle acceleration while the amount of decrease in the target engine revolution speed $N_E$ with respect to time is limited at the time of vehicle deceleration, in order that the target engine revolution speed does not change more abruptly than the actual engine revolution speed. This makes it possible to reduce shocks caused at the time of acceleration or deceleration and therefore smooth acceleration and deceleration can be ensured. The value of the target engine revolution speed $N_E$ is so set as not to exceed the actual engine revolution speed $n_E$ at the time of acceleration and not to fall below the actual engine revolution speed $n_E$ at the time of deceleration. This prevents the undesirable situation where the movement of the vehicle does not comply with the operation of the throttle. Further, when the throttle is abruptly operated, the value of the target engine revolution speed $N_E$ is once set to another value which is calculated based on the actual engine revolution $n_E$. This value is made to be a reference value for modulating the value of the target engine revolution speed $N_E$. With this arrangement, acceleration or deceleration can be quickly performed. Further, when the forward/reverse drive lever has been operated with the engine in a full-throttle state, the target engine revolution speed $N_E$ is once reduced, thereby increasing the acceleration rate.

While the equation (1) is used for obtaining the target speed ratio E in the foregoing embodiment, the following equation may be used.

$$E = e \times (n_E/N_E)$$

Alternatively, the preceding value E' of the target speed ratio may be substituted in the following equation.

$$E = E' + k(n_E - N_E)$$

The following equation may be also used.

$$E = E' \times (n_E/N_E)$$

In this case, there is no need to obtain the actual speed ratio e in order to obtain the target speed ratio E.

Although the actual motor speed ratio $e_m$ is obtained directly from the ratio of the revolution speed of the motor to the revolution speed of the engine, it may be obtained in other ways. For example, the revolution speed of the input shaft 23 and that of the output shaft 26 are detected taking the reduction ratio of the engine 21 etc. into account, and the actual motor speed ratio $e_m$ is obtained from the ratio of the revolution speed of the output shaft 26 to the revolution speed of the input shaft 23. Another alternative is such that the revolution speed of the input shaft 23 and that of the output shaft 54 of the variable displacement motor 53 are detected and the actual motor speed ratio $e_m$ is obtained from the ratio of the revolution speed of the motor 53 to the revolution speed of the input shaft 23. In these cases, the target revolution speed of the input shaft 23 for the throttle position X may be obtained from a throttle position signal from the throttle position detector 72, and the target motor speed ratio $E_m$ may be obtained through the arithmetic operation in which the target speed ratio of the revolution speed of the output shaft 26 to the revolution speed of the input shaft 23 is obtained by converting the actual motor speed ratio $e_m$ into the speed ratio of the revolution speed of the input shaft 23 to the revolution speed of the output shaft 26. In addition, the actual motor speed ratio may be obtained from the ratio of the revolution speed of the output shaft 26 to the revolution speed of the engine 21 or from the ratio of the revolution speed of the motor 53 to the revolution speed of the output shaft 26, taking the reduction ratio of the engine 21 etc. into account.

In the foregoing embodiment, the angle of the discharge controlling variable-angle swash plate 50a for the variable displacement pump 50 and that of the discharge controlling variable-angle swash plate 53a for the variable displacement motor 53 are controlled in accordance with the operation amount A by means of the angle changing valves 76, 77 respectively. However, the angle of either of the discharge controlling variable-angle swash plates 50a and 53a may be controlled.

While the invention has been particularly shown and described in reference to preferred embodiments thereof, it will be understood by those skilled in the art that changes in form and details may be made therein without departing from the spirit and scope of the invention.

What is claimed is:

1. A system for controlling a hydrostatic-mechanical transmission at the time of vehicle acceleration or deceleration, the transmission being equipped with a mechanical transmission unit actuated through an input shaft connectable to a power source; a hydrostatic transmission unit which is connectable to the input shaft and comprises a pump and motor having their respective discharge controlling swash plates, art angle of at least either of the swash plates being variable; and a differential unit for actuating both the mechanical transmission unit and the hydrostatic transmission unit by connecting an output shaft thereto, the control system comprising:

(a) throttle position detecting means for detecting a position of a throttle in relation to the power source;

(b) target revolution speed computing means for computing a target revolution speed for the power source in accordance with the position of the throttle detected by the throttle position detecting means, limiting an amount of change in the target revolution speed with respect to time;

(c) target motor speed ratio setting means for setting a target motor speed ratio, which is a target value for a ratio of a revolution speed of the motor in the hydrostatic transmission unit to the revolution speed or the power source, in accordance with the target revolution speed computed by the target revolution speed computing means; and (d) swash plate angle controlling means for controlling the angle of at least either of the discharge controlling swash plates in accordance with the target motor speed ratio set by the target motor speed ratio setting means.

2. The system for controlling a hydrostatic-mechanical transmission at the time of vehicle acceleration or deceleration as claimed in claim 1, wherein the target revolution speed computing means limits the amount of change in the target revolution speed with respect to time, according to whether the vehicle is in an accelerated state or decelerated state and according to the value of the target revolution speed.

3. The system for controlling a hydrostatic-mechanical transmission at the time of vehicle acceleration or deceleration as claimed in claim 1, wherein the target revolution speed computing means computes the target revolution speed for the power source such that the target revolution speed does not exceed the actual revolution speed of the power source when the vehicle is accelerated and such that the target revolution speed does not fall below the actual revolution speed of the power source when the vehicle is decelerated.

4. The system for controlling a hydrostatic-mechanical transmission at the time of vehicle acceleration or deceleration as claimed in claim 1, further comprising throttle displacement detecting means for detecting the amount of displacement of the throttle with respect to time, wherein when the throttle displacement detecting means detects that the throttle has been quickly operated, the target revolution speed computing means sets the target revolution speed for the power source to a value which is calculated according to the actual revolution speed of the power source.

5. The system for controlling a hydrostatic-mechanical transmission at the time of vehicle acceleration or deceleration as claimed in claim 1, further comprising forward/reverse drive lever operation detecting means for detecting that a forward/reverse drive lever has been operated, wherein when the forward/reverse drive lever operation detecting means detects that the forward/reverse drive lever has been shifted from a neutral position to a forward drive position or reverse drive position, the target revolution speed computing means sets the target revolution speed for the power source to a small value which is calculated according to the actual revolution speed of the power source.

* * * * *